April 24, 1962     M. A. STICKELBER     3,031,058
TWISTED LOAF ROLLER PANNER

Filed Dec. 14, 1959     4 Sheets-Sheet 1

INVENTOR.
MERLIN A. STICKELBER
BY
Alfred R. Fuchs
ATTORNEY

April 24, 1962    M. A. STICKELBER    3,031,058
TWISTED LOAF ROLLER PANNER
Filed Dec. 14, 1959    4 Sheets-Sheet 2

INVENTOR.
MERLIN A. STICKELBER
BY
Alfred R. Fuchs
ATTORNEY

April 24, 1962　　M. A. STICKELBER　　3,031,058
TWISTED LOAF ROLLER PANNER

Filed Dec. 14, 1959　　　　　　　　　　　　　4 Sheets-Sheet 3

INVENTOR.
MERLIN A. STICKELBER
BY
Alfred R. Fuchs
ATTORNEY

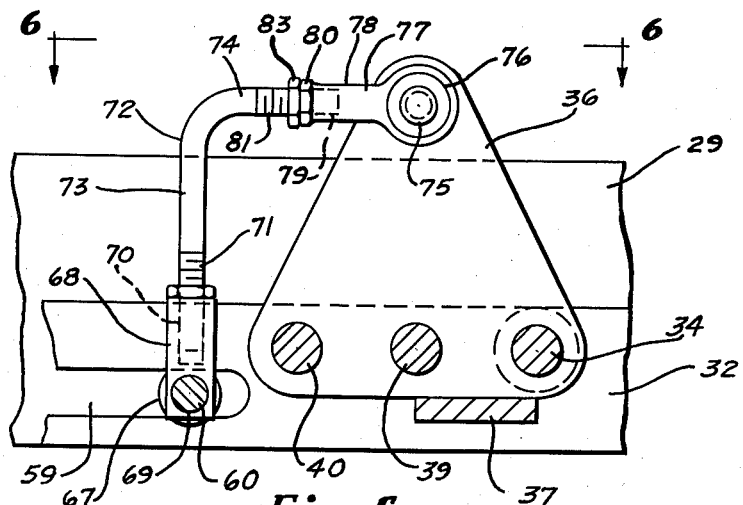
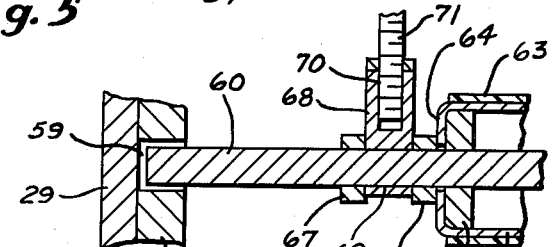
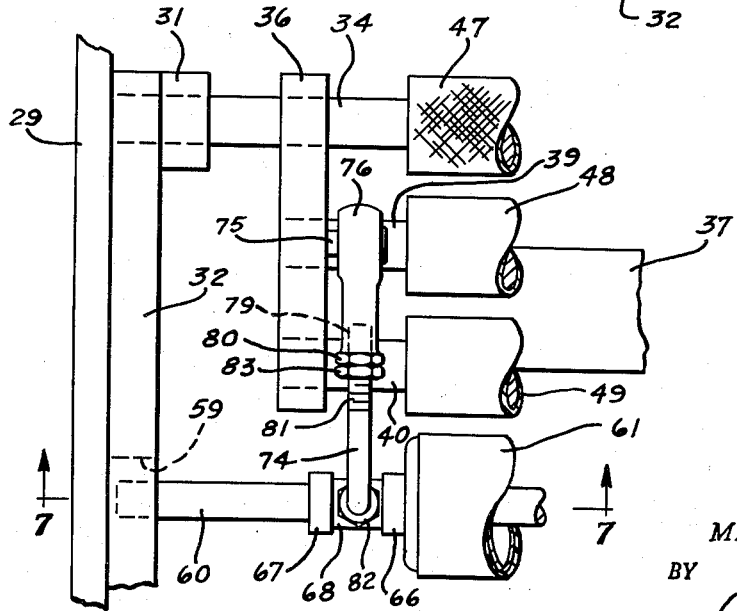

United States Patent Office 3,031,058
Patented Apr. 24, 1962

3,031,058
TWISTED LOAF ROLLER PANNER
Merlin A. Stickelber, Kansas City, Mo., assignor to Stickelber & Sons, Inc., a corporation of Missouri
Filed Dec. 14, 1959, Ser. No. 859,269
9 Claims. (Cl. 198—21)

My invention relates to loaf panning devices, and more particularly to a twisted loaf roller panner. My invention is an improvement over the Automatic Roller Discharge Panning Mechanism disclosed in the patent to Clarence A. Kieffaber, No. 2,964,890, patented December 20, 1960.

It is the principal purpose of my invention to provide a panning mechanism that is particularly adapted for depositing twisted bread loaves into a pan automatically, but which may also serve to pan ordinary untwisted bread loaves in such pans automatically. My invention is applicable to the panning of such twisted bread loaves whether the loaf is twisted by hand or mechanically, as disclosed for example, in Kieffaber Patent No. 2,843,062, patented July 15, 1958, on Bread Molding Machine. It is a further purpose of my invention to simplify the panning mechanism disclosed in the above referred to patent to Kieffaber No. 2,964,890.

In depositing a twisted loaf into a pan automatically difficulty is frequently encountered in preventing the loaf from becoming partially untwisted. Such a partially untwisted loaf causes a misshapen or crippled loaf of bread to be produced therefrom. In a panning mechanism it is important that each loaf be deposited in proper position in the pan so that it will not lap over the end edges or side edges or extend up on the side edges of the pan, but will lie in the bottom of the pan. In order to accomplish this purpose it is necessary that the panning apparatus deposit the loaves in the pans accurately so that each loaf is deposited substantially in the same position in the pan as the position of every other loaf in its pan. It is a purpose of my invention to deposit a twisted loaf in such a manner that it will not become partially untwisted and that each loaf will be deposited in its pan in the proper position, as above pointed out, without the use of a large number of the parts that are necessary for doing this in the automatic roller discharge panning mechanism disclosed in the above referred to Kieffaber patent application.

My improved apparatus avoids the untwisting of the twisted loaf by avoiding any sliding movement of the loaf in being transferred from the conveyor belt of a loaf conveyor, that forms part of the bread molding machine or part of a so-called twisting table, on which manual or hand twisting of machine molded bread loaves is done, to the pan, and in which the loaf is handled in a gentle enough manner that it will be deposited in twisted condition in the pan. This is accomplished by providing a support for the twisted loaves to which the twisted loaves are delivered by the loaf conveyor belt, which support is made up of a plurality of rollers that are so mounted and arranged that the rollers are rotatable about parallel axes and are movable from a loaf supporting position to one in which the discharge of the loaf into the pan in a gentle manner is accomplished.

More specifically my invention comprises such a loaf supporting means in which a group of the rollers is moved from a loaf supporting position to a loaf discharging position by a swinging movement of the mounting for said rollers and in which a single roller is so mounted that it can be moved into and out of loaf supporting position in a straight line toward and away from the position that the group of rollers has when it is in loaf supporting position.

The group of rollers that is mounted for pivotal or swinging movement is preferably mounted for such pivotal movement about an axis that is co-incident with the axis of the end roller of the group that is nearest the discharge end of the loaf conveyor but which axis is spaced from the axis of the conveyor roller over which the conveyor belt operates at its discharge end, and the single roller that is movable back and forth in a straight line, moves toward and away from the discharge end of said loaf conveyor and is so connected with the means for swinging the swingingly mounted rollers between loaf supporting and loaf discharging or dumping position that said single roller will be moved, simultaneously with the movement of the swingingly mounted rollers to dumping or discharge position, to a position in which it is at its greatest distance from the discharge end of the loaf conveyor and will be returned to a position in which it is adjacent the group rollers that is swingingly mounted upon the return of said group of rollers to loaf supporting position It is a further purpose of my invention to provide such a panning mechanism in which the rollers that are mounted to swing about an axis as a group are positively driven, each at the same peripheral speed in the same direction and, preferably at the same peripheral speed as the speed of the loaf conveyor belt, and to mount the single roller cooperating therewith in such a manner that it is free to rotate about its axis in either direction. By this arrangement the single roller that is mounted separately from the group of swingingly mounted rollers is adapted to rotate in the same direction as the group of rollers, which act as conveying means to carry the twisted loaf from the loaf conveyor belt into engagement with said single roller, when such a loaf is being fed into engagement with said single roller by said driven rollers, during the time that the plurality of rollers is in loaf supporting position, and is adapted to rotate in the opposite direction when the loaf is moving downwardly toward the pan as the group of swingingly mounted rollers is moving from loaf supporting to loaf discharging or loaf dumping position. One of the great advantages of this arrangement over the above referred to automatic roller discharge panning mechanism is that a large number of small driving gears, sprockets, chains, shafts, small rollers, and other small parts, are eliminated.

My invention further comprises means that is actuated by the loaf, that is carried by the roller conveying means along the loaf supporting means, to actuate the loaf supporting means to cause the group of rollers to swing to a loaf discharging position and the single roller to move out of loaf supporting position, simultaneously, said means actuated by the loaf comprising a controlling member that is mounted in such a position with respect to the single roller above referred to that it will only be actuated to cause the panning mechanism to discharge the loaf of bread into the pan, when the loaf has reached a predetermined position over and in engagement with said single roller, so that the loaf will be in proper position with respect to the single roller that the single roller can cooperate with the group of rollers that is swingingly mounted to guide the twisted loaf gently into the center of the pan and hold the ends thereof from untwisting. My invention further provides means for returning the loaf supporting means, comprising the swingingly mounted group of rollers and the single roller, to loaf supporting position after discharge of the loaf into the pans, which returning means is actuated, by means associated with the mounting means for the swingingly mounted group of rollers, so as to be operated when the mounting means has moved the supporting means to loaf discharging position.

In order to prevent any sticking of the dough of the twisted loaves to the rollers of my improved panning mechanism, it is a purpose of my invention to provide a surface covering for said rollers that is non-adhesive with respect to dough, and which is uninterrupted around the surface of the rollers to avoid exposure of any metal to the dough and avoid any grooves or cracks in which the dough can stick, and to provide a roughened surface on one roller of the group that is swingingly mounted, that which is nearest the discharge end of the loaf conveyor belt, so that said roller will have sufficient frictional engagement with the twisted loaf to pull it off the loaf conveyor belt and feed it to the other rollers of the group. It has been found that synthetic resin coatings or covering plies of a cylindrical character, made of polytetrafluoroethylene, polyethylene, or other similar non-adhesive coatings or covering plies are particularly suitable for the purpose of providing a covering for said rollers to which dough will not stick.

In order to prevent any tendency of the twisted loaf to follow the conveyor belt around the conveyor belt roller at the discharge end of the loaf conveyor, it is necessary that the roller that is part of the loaf supporting means for the panning mechanism that is nearest the discharge end of the loaf conveyor belt be as closely adjacent as possible to the said conveyor belt roller at said discharge end of the loaf conveyor belt and as close as possible to said loaf conveyor belt at its discharge end. In order to accomplish this purpose, the rollers of the group that are swingable about a horizontal axis adjacent the discharge end of the loaf conveyor belt are made of much smaller diameter than the conveyor roller at said discharge end and are preferably of such size that the roller of the group nearest the discharge end of the loaf conveyor will be located entirely above the axis of rotation of the loaf conveyor belt roller, but in such a position that the group of rollers will be located at a slightly lower level than the top surface of the loaf conveyor belt when these rollers are in loaf supporting position.

It is a further purpose of my invention to provide in a panning mechanism in which the group of rollers of the character above referred to is so arranged with respect to the discharge end of a loaf conveyor belt and so related to the conveyor roller at said discharge end of said belt with a single roller cooperating therewith in the manner hereinbefore set forth, that is of a larger diameter than the rollers of the group, but which is of a smaller diameter than said conveyor belt roller and which has the top surface thereof located at a lower level than the plane that is tangent to the top surface of the group of rollers when these are in loaf supporting position, said single roller thus being in a position such that it will aid in guiding the twisted loaf, in cooperation with the group of rollers, into the center of the pan that is located on the pan conveyor in position to receive the twisted loaf.

Other objects and advantages of my invention will appear as the description of the drawings proceeds. I desire to have it understood, however, that I do not intend to limit myself to the particular details shown or described, except as defined in the claims.

In the drawings:

FIG. 5 is an enlarged fragmentary view partly in elevation and partly in section on the line 5—5 of FIG. 1.

FIG. 6 is a fragmentary top plan view taken substantially on the line 6—6 of FIG. 5, and FIG. 7 is a fragmentary sectional view taken on the line 7—7 of FIG. 6.

Figure 1:
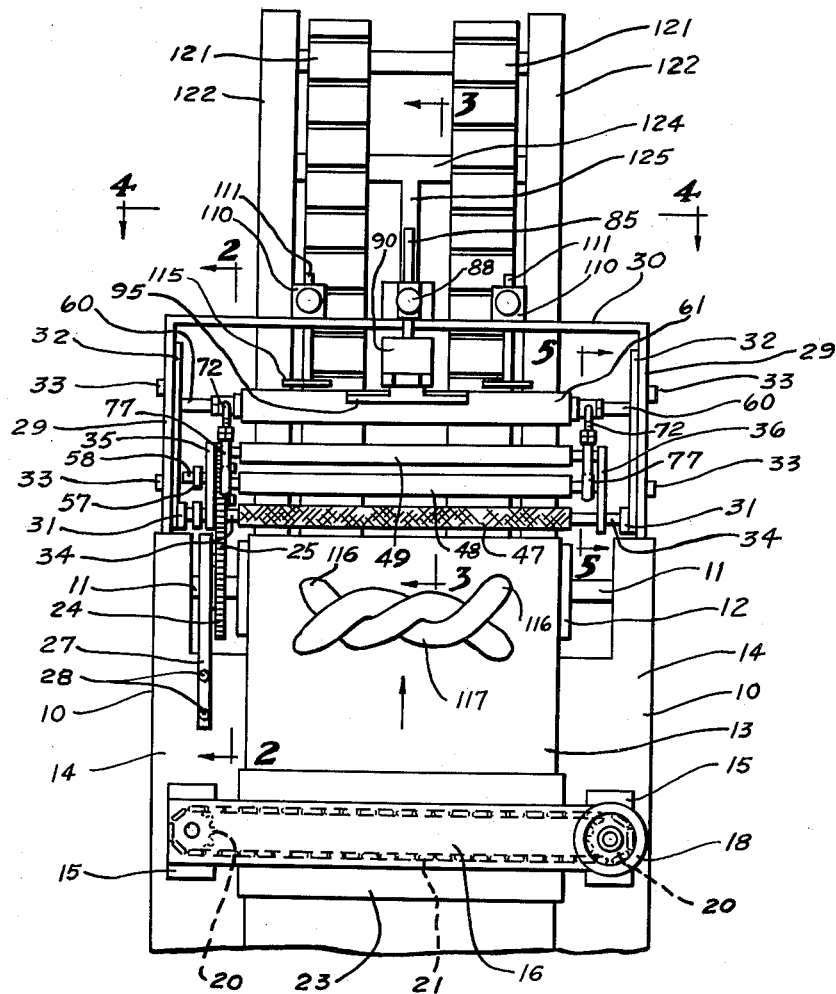
FIG. 1 is a plan view of my improved twisted loaf panning mechanism, a portion of a loaf conveyor to which the same is applied being shown in plan therein.

Referring in detail to the drawings, in FIG. 1 is shown the discharge end of a loaf conveyor, which may be provided on a table for manually twisting the loaves, which is preferably associated with a bread molding machine, or which may be a loaf conveyor that is at the discharge end of a machine for automatically twisting loaves of bread such as the bread molding machine disclosed in the above referred to Patent No. 2,843,062. Whether the loaves are twisted by hand or automatically by machine, such a conveyor belt for the loaves is part of the apparatus that is necessary for conveying such twisted loaves to any panning mechanism. As shown in the drawings, a frame 10 is provided, that has suitable bearings for a roller shaft 11 that has the conveyor roller 12 mounted thereon to rotate therewith. The loaf conveyor belt 13 operates over the roller 12 and said roller rotates in the direction indicated by the arrow in FIG. 3, the upper run of the conveyor belt traveling in the direction of the arrow thereon in FIG. 1.

The frame 10 has a table portion 14, over which the upper run of the conveyor belt 13 operates. Suitable standards 15 extend upwardly from the frame 10 and are connected at their upper ends by a suitable cross member 16. Bearing blocks 17 are mounted slidably in the standards 15 and are adjustable vertically in the standards by means of a hand wheel 18 mounted on a shaft 19, with which one of the bearing blocks 17 is screw-threadedly connected. A suitable driving connection, such as the pair of sprocket wheels 20 and the sprocket chain 21, is provided for simultaneously adjusting both of the bearing blocks 17 by means of the hand wheel 18, a shaft 19′ being provided on the opposite side of the apparatus from the hand wheel 18, which is screw-threadedly engaged with the bearing block 17 on that side of the machine. A shaft 22 is mounted in the bearing blocks 17 for rotation therein and a roller 23 is mounted on the shaft 22, said roller being adapted to be adjusted vertically with respect to the table 14 and conveyor belt 13 by rotation of the hand wheel 18 in the desired direction.

The belt 13 transports twisted bread loaves, twisted by a suitable twisting mechanism such as above referred to, or loaves that have been twisted by hand. In either case, the loaves are made up of a plurality of dough pieces that have been sheeted and coiled up on themselves to form loaf portions that are then twisted either by hand, while on the belt 13, or by a suitable mechanism that delivers the twisted loaves to the belt 13. The roller 23 is provided so that it may be adjusted so as to exert a flattening pressure on the twisted loaf so as to firmly adhere the twisted loaf portions together. The twisted loaf thus formed is carried to the discharge end of the conveyor belt 13 and discharged from said belt where it passes over the roller 12 to the panning mechanism.

The conveyor belt 13 is driven in any suitable manner from the end thereof opposite that having the roller 12 thereon. However, the roller 12 is mounted on the shaft 11 so as to rotate therewith, and thus the rotation of the roller 12 by means of the belt 13 positively drives the shaft 11. Fixed on the shaft 11 to rotate therewith is a spur gear 24, the gear 24 rotating in the direction indicated by the arrow in FIG. 2. The gear 24 meshes with a smaller spur gear 25 mounted on a shaft 26, which is mounted in a suitable bearing in a bar-like bracket member 27, which is fixed in any suitable manner to the frame 10, as by means of fastening elements 28.

A frame having the side members 29, extending longitudinally of the machine, and a cross member 30, is also fixed in a suitable manner on the frame 10 and extends endwise therefrom. Suitable bearings 31 are mounted on bars 32 secured on the members 29, said bars 32 being secured to the side members 29 by means of securing elements 33. A shaft 34 is mounted in the bearings 31, Mounted on the shaft 34 is a triangular plate 35. Said plate 35 is provided on one side of the machine, while on the other side of the machine is a similar triangular plate 36. Said plate 36 is also mounted on the shaft 34, and both said members 35 and 36 are pivotally mounted on said shaft so as to be capable of swinging about the shaft 34. Upon reference to FIG. 2, it will be noted that the axis of the shaft 34 and thus the pivotal axis of the members 35 and 36 is at a considerably higher level than the axis of the shaft 11. A cross bar 37 connects the plates 35 and 36 to hold the same in transverse alignment.

Mounted on the shaft 34 to rotate therewith is a spur gear 38, which meshes with the gear 25 and is thus driven by the roller 12 in the same direction as said roller 12. The plates 35 and 36 serve as mounting members for the shafts 39 and 40, which have the spur gears 41 and 42 mounted thereon to rotate therewith, suitable bearings being provided in the members 35 and 36 for the shafts 39 and 40. Bearings for the shafts 43 and 44 are also provided in the plate 35 and the spur gears 45 and 46 are mounted on the shafts 43 and 44. Because of the interposition of the gears 45 and 46 the gears 38, 41 and 42 all rotate in the same direction. Rollers are provided on each of the shafts 34, 39 and 40, the rollers being indicated by the numerals 47, 48 and 49, respectively. Accordingly all said rollers 47, 48 and 49 rotate in the same direction, the rotation being clockwise as viewed in FIG. 3 and corresponding to the direction of rotation to the roller 12.

Each of said rollers comprises a central metallic core 50 and an outer cylindrical coating or covering 51 of a synthetic resin to which dough will not stick, such as polytetrafluoroethylene or polyethylene. The shafts 34, 39 and 40 may be made integral with the metallic cores 50 of the rollers or may be mounted in the cores, as may be desirable, but said shafts and cores must rotate as a unit in any event.

Figures 2, 3:
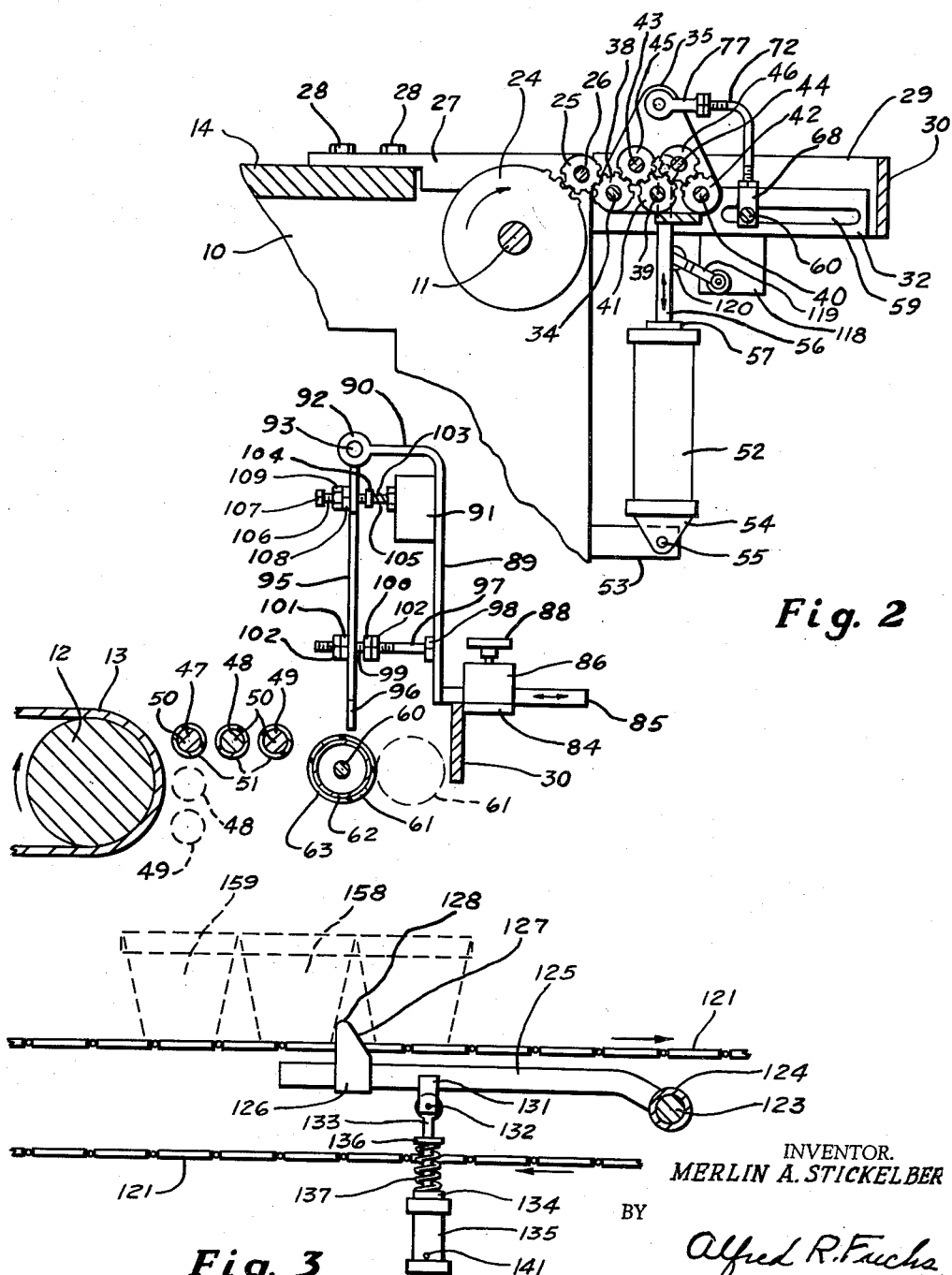
FIG. 2 is a section taken on the line 2—2 of FIG. 1 on a slightly enlarged scale.
FIG. 3 is a similar section taken on the line 3—3 of FIG. 1, the frame, gearing and operating connections between the single roller and the group of swingingly mounted rollers being omitted.

The group of rollers 47, 48 and 49 are adapted to be swung about the axis of the roller 47 due to the mounting thereof on the members 35 and 36. It will be noted that the roller 47 is provided with a roughened surface in order that it will serve to pull the twisted loaf off the conveyor belt 13 and feed it toward the rollers 48 and 49. Suitable means for swinging the plates 35 and 36 about the axis of the shaft 34 is provided. Said means comprises an air cylinder 52, which is mounted on a bracket 53 by means of a pair of pivot ears 54 so as to pivot about the pivot member 55. A piston rod 56 extends upwardly from the air cylinder 52, being slidably mounted in a suitable packing gland 57 at the upper end thereof, said piston rod 56 being pivotally connected with the plate 35 by means of the pivot pin 58. As the piston within the cylinder 52 is moved downwardly from its uppermost position, which is that in which the parts are shown in FIG. 2, the pivotal mounting of the cylinder 52 making provision for movement of the piston rod 56 out of the position shown in FIG. 2 into an inclined position, the member 35 will be swung in a clockwise direction as viewed in FIG. 2. The stroke of the piston is such that the member 35 will turn through an angle of substantially ninety degrees and thus the rollers 48 and 49 will swing about the axis of the roller 47 into the dotted line position thereof shown in FIG. 3, or a position approximating such vertical alignment of the rollers as shown in FIG. 3.

As the rollers 47, 48 and 49 are driven constantly in a clockwise direction as viewed in FIG. 3, the loaf that is discharged from the conveyor belt 13 onto the roller 47 will be carried to the right by said rollers when the same are in the full line position shown in FIG. 3. Such clockwise rotation of said rollers will continue through the movement of the same from the full line position to the dotted line position shown in FIG. 3, as the drive of said rollers will be constantly operating as the group of rollers is swung to the dotted line position.

The bars 32 are provided with longitudinally extending slots 59 therein, that are of the same length and are aligned transversely of the frame made up of the members 29 and 30. Slidably mounted in said slots are the ends of the shaft 60. A roller 61 is freely rotatably mounted on the shaft 60, said roller having a hollow tubular metallic body portion 62 and a surface coating or covering 63 of a tubular or cylindrical character provided thereon, which is of the same synthetic resin material as the surface coverings or coatings on the rollers 47, 48 and 49. Said roller is provided with inturned end walls 64 and disk-like members 65 secured in the ends thereof to provide suitable bearings for the shaft 60, said roller 61 thus being freely rotatably mounted on the shaft 60. A collar 66 is mounted on the shaft 60 at each end of said roller 61 to hold said roller against endwise movement on said shaft.

The collar 67 is mounted in spaced relation with respect to each collar 66 and a bracket 68 is mounted between each pair of collars 66 and 67, said bracket 68 having a transverse opening 69 therein that rotatably receives the shaft 60 and having a longitudinally extending opening 70 therein that is internally screw-threaded. The bracket 68 is of an elongated character, as will be obvious from FIGS. 2, 5 and 7, and has the screw-threaded end portion 71 of a curved rod 72, which has a pair of portions 73 and 74 that extend at right angles to each other, screw-threadedly mounted in the screw-threaded opening 70 thereof, the portion 73 of the rod 72 extending vertically when the parts are in the position shown in FIGS. 2 and 5 and the portion 74 thereof extending horizontally when in this position. The triangular members 35 and 36 are each provided with a pivot pin 75 on which the hub portion 76 of a fitting 77 is pivotally mounted. Said fitting 77 has an arm 78 extending therefrom, which is provided with an internally screw-threaded opening 79 therein and which has a hexagonal end portion 80 thereon. The arm 74 of each of the rods 72 is provided with a screw-threaded end portion 81 that engages in the internally screw-threaded opening 79. A lock nut 82 is provided on the screw-threaded end portion 71 and a lock nut 83 is provided on the screw-threaded end portion 81. By the screw-threaded connections between the screw-threaded ends 71 and 81 and the bracket 68 and the fitting 77, respectively, the length of the two arms of the connection provided by means of the rods 72, the fitting 77 and the bracket 68 can be adjusted so as to get the proper position for the shaft 60 in the slot 59, when the triangular members 35 and 36 are in the position shown in FIGS. 1 and 5, so that the roller 61 will be in properly spaced relation to the roller 49 of the group made up of the rollers 47, 48 and 49 when said rollers 47, 48 and 49 are in their horizontally aligned loaf supporting position.

It will be obvious that as the triangular members 35 and 36 swing about the pivotal axis of the shaft 34 from the position shown in FIG. 2 and FIG. 5, to a position such that the rollers 48 and 49 will have the dotted line position shown in FIG. 3, the pivot pin 75 will move through an arc of substantially 90 degrees and during such movement of the pivot pin 75 the shaft 60 will move toward the right in FIG. 2 along the slots 59, or toward the left in FIG. 5, so as to move the roller 61 carried by the shaft 60 a substantial distance to the right from the full line position shown therefor in FIG. 3 to substantially the dotted line position therefor shown in FIG. 3. Upon return movement of the triangular members 35 and 36 to the position shown in FIGS. 2 and 5 the shaft 60 and the roller 61 will move back to the position shown therefor in FIGS. 2 and 5.

Mounted on the cross member 30 of the frame having the side members 29 is a bracket 84, which has an opening therein for slidably receiving the bar 85, which is square in cross section, the upstanding portion 86 of said bracket having a square opening for slidably receiving said square in cross section rod 85. A clamping screw 87 having the operating member 88 thereon is provided for clamping the rod 85 in adjusted position in the bracket 84 and thus relative to the transverse wall 30. Mounted on said bar is an upstanding arm 89 of a bracket having a horizontally extending upper end portion 90 and mounted on said bracket is a limit switch 91. A pair of socket members 92 is provided on the extremity of the horizontally extending arm 90 and a pivot pin 93 is mounted in said socket members 92. A bearing member 94 is provided on the upper end of a vane 95 that receives the pivot pin 93 so as to mount the vane 95 pivotally on the extremity of the horizontally extending arm 90 of the bracket. The lower end of the vane 95 is provided with a cross member 96, which extends laterally beyond the side edges of the vane 95. Mounted on the upstanding portion 89 of the bracket, which is fixed to the extremity of the rod-like member 85 by welding or otherwise, is a guide rod 97, said guide rod being mounted in fixed position on the upstanding arm 89 of the bracket, being secured thereto in fixed position by any suitable enlargement 98 thereon, and said guide rod has a screw-threaded portion 99 with which the stop nuts 100 and 101 are screw-threadedly engaged and held in adjusted position by means of the lock nuts 102. It will be obvious that the movement of the vane 95 will be determined by the spacing of the stop nuts 100 and 101.

The limit switch 91 has an operating stem 103 thereon, which is provided with a head 104 and a compression spring 105 normally urges the head 104 toward the left in FIG. 3. The vane 95 has a screw-threaded member 106 engaging in a screw-threaded opening therein, said member 106 being provided with a head 107 by means of which the stem can be adjusted with respect to the vane 95 and, preferably, a nut 108 and a lock nut 109 are provided for locking the member 106 in adjusted position. The adjustment of the member 106 is such that the end thereof in engagement with the head 104 will be lightly engaging said head when the spring 105 has moved the vane 95 into engagement with the stop nut 101 and so that the switch 91 will be closed by movement of the end of the adjusting screw 106 with the vane 95 to move the head 104 and the switch operating member 103 into switch closing position when the vane 95 engages the stop nut 100. Thus, if a loaf is moved by means of the rollers 47, 48 and 49 onto the roller 61 sufficiently to move the vane 95 by engagement of the cross member 96 thereof from the position shown in FIG. 3 to a position such that the vane 95 will engage with the stop nut 100 the switch 91 will be closed and the operation, which the closing of the switch initiates, will begin. Thus a movable stop member with which a loaf is adapted to engage is provided for closing the switch 91, which switch is a micro switch of such a character that a very small amount of movement of the vane 95 is necessary to operate the switch.

Mounted on the cross member 30 are brackets 110, which have openings therein for slidably receiving the rod-like members 111 that have flattened portions 112 thereon with which the clamping screws 113 engage, said clamping screws having operating members 114. It will thus be obvious that the rods 111 can be adjusted in any desired position in said brackets 110. Plate-like members 115 are provided on the outer ends of the rod-like members 111, and it will be obvious that the position of the plate-like members 115 can be adjusted with respect to the transversely extending portion 96 of the vane 95 so that the projecting end pieces 116 of the twisted loaf 117 will engage said plate-like members 115 at the same time that the main body portion of the loaf 117 will engage the cross member 96 to move the switch 91 to circuit closing position. Thus the plate-like members 115 cooperate with the member 95 to maintain the twisted loaf in a position such that it will be straight in the pan when it is deposited therein by the panning mechanism.

A switch 118 is mounted on the side member 29 of the frame that has the triangular member 35 adjacent thereto, said switch having a pivotally mounted arm 119 thereon for operating the same, the arm 119 being biased to normally hold the switch in the position therefor shown in FIG. 2. A roller 120 is provided on the arm 119 and the laterally projecting pivot pin 58 projects from the triangular plate 35 in such a position as to engage with the roller 120 when the triangular plate 35 is approaching the limit of its movement in a clockwise direction from the position shown in FIG. 2 or when it has moved through an angle of substantially 90 degrees from the position shown in FIG. 2.

Pan conveying means made up of a pair of transversely spaced conveyors each made up of pivotally connected plate-like members 121 is mounted on the longitudinally extending frame members 122, the upper run of said conveyors traveling in the direction indicated by the arrow in FIG. 3. Mounted for swinging movement about a transverse shaft 123 extending crosswise of the frame between the members 122 is a shaft having a sleeve 124 mounted thereon providing for swinging movement of the arm 125 about the axis of the shaft 123. Mounted on said arm 125 is a pan stop member 126, which has a beveled face 127 and a rounded upper end or nose 128 thereon. The body portion of the stop member 126 is split at 129, as will be obvious from FIG. 4, and is provided with a clamping screw 130. It will be obvious that by releasing the screw 130 the pan stop 126 can be adjusted on the arm 125 and can be clamped in adjusted position on said arm by means of the screw 130.

A pair of ears 131 depend from the member 125, being rigidly secured thereto and having a pivot pin 132 extending therethrough for pivotally connecting a piston rod 133 therewith. Said piston rod 133 extends through a suitable packing gland 134 into an air cylinder 135 and has a collar 136 provided thereon, between which and the cylinder 135 a compression coil spring 137 is mounted, said spring normally holding the pan stop in the raised position shown in FIG. 3. The air cylinder 135 is mounted on a bracket 138 extending from an L-shaped bracket 139 that is mounted on one of the frame members 122. When air under pressure is supplied to the cylinder 135 through the conduit 140 the piston in the cylinder 135 is moved downwardly, said cylinder 135 having an opening 141 to the outer air at the lower end thereof, thus pulling the pan stop 126 downwardly. The stroke of the piston in the cylinder 135 is made very short and the movement of the stop 126 downwardly is accomplished very quickly, and immediately after such downward movement the spring 137 restores the piston to the position shown in FIG. 3.

The supply of air to the cylinder 52 is controlled by means of a valve 142 from which the flexible conduits 143 and 144 extend to opposite ends of the cylinder 152, so that the conduits communicate with the space on opposite sides of the piston in said cylinder. A conduit 145 is provided for supplying air under pressure to said valve 142 and to a similar valve 146 through the branch conduits 147 and 148. The valve 146 only has the conduit 140 extending between the same and the cylinder 135. The valves 142 and 146 are solenoid valves having the movable cores 149 and 150 therein, that determine the position of the valve means within said valves, the position of the cores being determined by means of solenoids located within the casings 151 and 152 on said valves. Said valves are preferably of the general character of the valve shown and described in the application of Clarence A. Kieffaber, Serial No. 498,181, Patent No. 2,964,890, filed March 31, 1955, hereinbefore referred to, and are operated in a manner controlled by the position of the switches 91 and 118 through an operating circuit such as disclosed in said application Serial No. 498,181.

Figure 4:
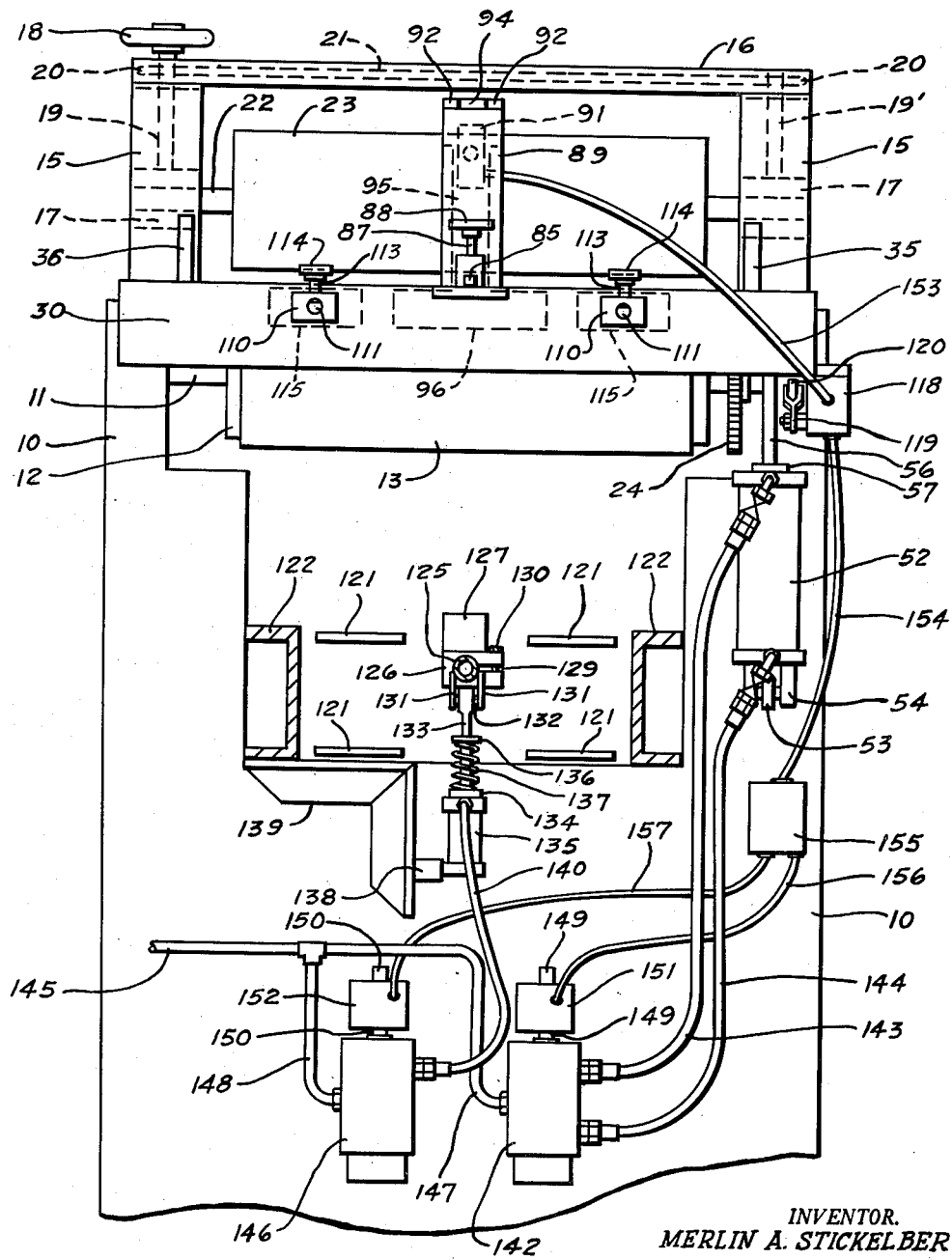
FIG. 4 is a sectional view taken on the line 4—4 of FIG. 1 partly broken away and on an enlarged scale.

In FIG. 4 an electrical conduit 153 is shown as extending from the switch 91 to the switch 118 and an electrical conduit 154 is shown as extending from the switch 118 to the relay 155, from which the conduits 156 and 157 extend, respectively, to the solenoids of the valves 142 and 146. Said electrical conduits contain the conductors of the electrical circuit required for operating the solenoid valves to properly control the operation of the roller panning mechanism and the pan stop member by means of the air cylinders 52 and 135. The relay 155 operates in the manner described in the above referred to application Serial No. 498,181 to act as a holding relay.

Thus after the switch 91 has been moved to circuit closing position by movement of the vane 95, the circuit will remain closed due to the operation of the relay even though the loaf has moved away from the vane 95 due to the movement of the rollers 47, 48 and 49 and the roller 61 toward the loaf discharging position. The switch 118 is normally closed and is opened by engagement of the projecting pin 58 with the roller 120 thereof. The circuit connections are such that the switch 118 serves to hold the relay in circuit closing position until said switch 118 is moved to open position. Since the switch 91 will also have moved to open position before that, due to the loaf having left its position in engagement with the vane 95, the holding relay will move to circuit opening position, de-energizing the solenoid of the valve 142, whereupon the valve 142 is moved into its return position, by means of a spring that is provided in the valve for this purpose, upon de-energization of the solenoid winding.

When the circuit through the switch 91 is first closed, the solenoid winding of the valve 142 is energized so as to move the valve 142 to such a position that air under pressure is supplied through the valve 142 from the supply conduit 145 and the branch conduit 147 to the conduit 143, which supplies air under pressure to the upper end of the cylinder 52 to cause downward movement of the piston in said cylinder and movement of the rollers to the dotted line position shown in FIG. 3. At the same time the valve 142 connects the conduit 144 to the open air, thus discharging air under pressure from the bottom side of the cylinder in the piston 52. However, when the solenoid of the valve 142 is de-energized, the valve moves to such a position that air is supplied under pressure through the conduits 145 and 147 to the conduit 144 and through the conduit 144 to the lower end of the cylinder 52 below the piston therein, which causes upward movement of the piston in the cylinder 52, the conduit 143 at the same time being open to the outer air through valve 142, by the position thereof, to permit such movement of the piston in the cylinder. Accordingly when the switch 91 is first closed, the piston in the air cylinder 52 moves the rollers 48 and 49 and the roller 61 to the dotted line position shown in FIG. 3, while where the valve 118 is actuated so as to be opened by downward movement of the mounting means for the rollers 47, 48 and 49 the rollers are returned to the full line position shown in FIG. 3.

The solenoid winding of the valve 146 moves the valve 146 into a position to connect the conduit 140 with air under pressure supplied through the valve from the compressed air supply 145 through the branch conduit 148. The switch 118 serves to close the circuit to energize the solenoid winding of the valve 146 when it is moved out of the position in which it closes the circuit of the holding relay above referred to. Due to the slight amount of lag in the movement of the parts, the energization of the solenoid of the valve 146 will not take place until after the piston in the cylinder 52 has begun its return or upward movement. Thus the solenoid valve 146 will not be energized to supply air under pressure to the conduit 140 until after the loaf has been deposited in the pan that is in a position to receive this loaf, which would be the pan 158. However, when such energization of the solenoid of the valve 146 does take place, the air under pressure supplied to the cylinder 135 through the conduit 140 will cause a quick short movement of the piston in said cylinder and of the pan stop 126 downwardly out of engagement with the pan 158, whereupon the conveyors 121 will quickly move the pans to the right as viewed in FIG. 3. However, as the projection 58 is only in engagement with the roller 120 for a short portion of the movement of the plate 35, the supply of air under pressure to the cylinder 135 is for a very brief interval, and as soon as the supply of air ceases the piston in the cylinder 135 is returned to its uppermost position due to the action of the spring 137 returning the pan stop 126 to its holding position, which would be a position to engage with the pan 159. If the conveyor has not moved the pan far enough for the pan stop to have left the bottom of the pan 158, the pan stop will remain in depressed position until the space between the pans 158 and 159 has been reached, whereupon the pan stop 126 will, under action of the spring 137, move into engagement with the pan 159. The pan 159 will then be in a position corresponding to that shown for the pan 158 in FIG. 3, ready to receive the next loaf to be discharged by the roller panning mechanism.

In operation, the twisted loaf of bread 117, which is carried along by the conveyor belt 13 toward the supporting means therefor, comprising the rollers 47, 48 and 49, passes from the discharge end of the belt 13 onto the roller 47 and is carried by the rotation of the rollers 47, 48 and 49 toward the right as viewed in FIG. 3, until it engages with the roller 61, and will be carried on across the roller 61, rotating it in a clockwise direction, until it engages sufficiently with the vane 95 to close the switch 91. The point at which this occurs in the travel of the molded loaf depends upon the adjustment of the vane 95 and the adjustment of the switch operating means 107 on the vane 95. The adjustment of the position of the vane 95 and of said switch operating means is such that the loaf will be discharged properly from the roller supporting means for the loaf into the pan portion 158, the roller 61 cooperating with the rollers 48 and 49 to guide the loaf gently into position in the pan, such as the pan 158, in position for receiving the loaf. Obviously a very close adjustment of the position of both the pan, and the vane and the switch operating means, can be obtained by the adjusting means provided for the pan stop, the switch 91 and the vane 95, the position of the vane 95, when the loaf engages with the transverse portion 96 thereof, being determined by the position of the stop nut 101. When the switch 91 is closed the circuit connections are made to cause the piston in the cylinder 52 to move downwardly, moving the triangular plates 35 and 36 in a clockwise direction as viewed in FIG. 2 about the axis of the shaft 34, and causing the roller 61 to move toward the right as viewed in FIG. 3, due to the connection between the triangular members 35 and 36 and the shaft 60, this continuing until the rollers 48 and 49 reach substantially the dotted line position shown in FIG. 3 and the roller 61 reaches the dotted line position shown in said figure.

Upon the parts reaching this dotted line position shown in FIG. 3, the switch 118 is actuated to de-energize the solenoid of the valve 142 and energize the solenoid of the valve 146, the lag in the movement of the parts permitting the beginning of the upward movement of the rollers 48 and 49 and the return movement of the roller 61 before the stop member 126 is moved quickly downwardly as the result of the energization of the solenoid of the valve 146 in the manner above explained, the movement of the parts to the full line position shown in FIG. 3 being accomplished quickly due to the fact that air is supplied to the under side of the piston and the cylinder on the upper side of the piston is open to the air so that the parts quickly return to a position for receiving the next loaf for panning. It will be noted that the movement of the roller 61 out of the full line position shown in FIG. 3 toward the dotted line position thereof will gradually increase in speed as the movement toward the right progresses, and that on the return movement the roller 61 will move at its highest rate upon beginning such return movement and gradually decrease in its speed of movement toward its full line position.

What I claim is:

1. The combination with a loaf conveyor of loaf supporting means mounted relative to said conveyor to receive loaves from the discharge end of said loaf conveyor, said supporting means comprising a member mounted in spaced relation to the discharge end of and at a lower level than said loaf conveyor, means mounted for swinging movement about an axis adjacent said discharge end of said loaf conveyor between a horizontal loaf supporting position to extend between said conveyor and said member and a depending dumping position, said member being mounted for horizontal movement toward and away from said discharge end of said loaf conveyor, and an operating connection between said swingingly mounted means and said member to move said member in synchronism with said swingingly mounted means.

2. The combination with a loaf conveyor of loaf supporting means mounted relative to said conveyor to receive loaves from the discharge end of said loaf conveyor, said supporting means comprising a roller mounted for free rotation about an axis horizontally spaced from the discharge end of said loaf conveyor, a roller conveyor mounted for swinging movement about the axis of one of the rollers thereof, said axis being adjacent but spaced from said discharge end of said loaf conveyor, said roller conveyor being swingable between a position in which it extends between said loaf conveyor and said roller and a dumping position, said roller being mounted for horizontal movement toward and away from said discharge end of said loaf conveyor, and an operating connection between said roller conveyor and said last mentioned roller whereby said roller is moved horizontally in synchronism with the swinging movements of said roller conveyor.

3. In a loaf panning device, loaf supporting means comprising a plurality of rollers including a single roller and a group of rollers, said single roller being of larger diameter than the rollers of said group, means for mounting said plurality of rollers for rotation about parallel axes comprising means for mounting said group and means for mounting said single roller, said group roller mounting being pivoted to swing about an axis at one end of said group between a loaf supporting position and a loaf dumping position and said single roller mounting providing for movement of the axis of rotation thereof in a straight line toward and away from the axis of said group mounting and an operating connection between said mountings to move said single roller between a loaf supporting position adjacent the other end of said group when said group is in loaf supporting position with the top surface of said single roller at a lower level than the top surfaces of the rollers of said group and a position spaced further from the axis of said group mounting than said loaf supporting position.

4. In a loaf panning device, loaf supporting means comprising a plurality of rollers including a single roller and a group of rollers said single roller being of larger diameter than the rollers of said group of rollers, means for mounting said plurality of rollers for rotation about parallel axes comprising means for mounting said group and means for mounting said single roller, said group roller mounting being pivoted to swing about an axis at one end of said group between a loaf supporting position and a loaf dumping position, said single roller mounting providing for movement of the axis of rotation of said single roller in a straight line toward and away from said pivotal axis of said group mounting, and means for simultaneously moving said group mounting from loaf supporting to loaf dumping position and said single roller away from the pivotal axis of said group mounting.

5. In a loaf panning device, loaf supporting means comprising a plurality of rollers including a single roller and a group of rollers, said single roller being of larger diameter than the rollers of said group of rollers, means for mounting said plurality of rollers for rotation about parallel axes comprising means for mounting said group and means for mounting said single roller, said group roller mounting being pivoted to swing about an axis at one end of said group between a loaf supporting position and a loaf dumping position and said single roller mounting positioning said single roller adjacent the other end of said group when said group is in loaf supporting position with the top surface of said single roller at a lower level than the top surfaces of the rollers of said group, means for moving said group roller mounting toward dumping position and controlling means for said last mentioned means comprising a controlling member mounted relative to said single roller to be actuated by engagement of a loaf therewith upon said loaf reaching a predetermined position in engagement with said single roller.

6. The combination with a loaf conveyor of loaf supporting means mounted relative to said conveyor to receive loaves from the discharge end of said loaf conveyor, said supporting means comprising a roller mounted for rotation about an axis horizontally spaced from the discharge end of said loaf conveyor and a roller conveyor mounted for swinging movement about the axis of one of the rollers thereof adjacent but spaced from said discharge end of said loaf conveyor, said roller conveyor being swingable between a position in which it extends between said loaf conveyor and said roller and a dumping position, said roller being of larger diameter than the rollers of said roller conveyor and mounted for horizontal movement toward and away from said discharge end of said loaf conveyor, means for simultaneously moving said roller conveyor toward dumping position and said roller away from the discharge end of said loaf conveyor and controlling means for said last mentioned means comprising a controlling member mounted relative to said single roller to be actuated by engagement of a loaf therewith upon said loaf reaching a predetermined position in engagement with said single roller.

7. The combination with a loaf conveyor, of loaf supporting means at the discharge end of said loaf conveyor extending endwise from said loaf conveyor, said loaf supporting means comprising a plurality of rollers, means for mounting said rollers for rotation about parallel axes extending transversely of the direction of travel of said loaf conveyor, said mounting means comprising mounting means for a group of said rollers and mounting means for a single roller, said group roller mounting means comprising a pair of members mounted for swinging movement about an axis co-incident with the axis of one of the end rollers of said group and adjacent but spaced from the discharge end of said loaf conveyor between a position in which all the rollers of said group are horizontally adjacent in loaf supporting position at a lower level than the discharge end of said loaf conveyor and a dumping position, and the mounting means for said single roller providing for movement of said roller between a position horizontally adjacent the roller of said group most remote from said axis to a position spaced horizontally therefrom, said single roller being of larger diameter than and mounted with its top surface at a lower level than the top surfaces of the rollers of said group, and an operating connection between said mountings whereby said single roller mounting is moved toward said horizontally spaced position by movement of said group roller mounting toward dumping position and toward horizontally adjacent position by movement of said group roller mounting toward said loaf supporting position.

8. The combination with a loaf conveyor of loaf supporting means mounted relative to said conveyor to receive loaves from the discharge end of said loaf conveyor, said supporting means comprising a roller mounted for free rotation about an axis horizontally spaced from the discharge end of said loaf conveyor and a roller conveyor mounted for swinging movement about the axis of one of the rollers thereof adjacent said discharge end of said loaf conveyor, said roller conveyor being swingable between a position in which it extends between said loaf conveyor and said roller and a dumping position, said freely rotating roller being mounted for horizontal movement toward and away from said discharge end of said loaf conveyor, said last mentioned roller having a metal core and a continuous synthetic resin covering over said core.

9. The combination with a belt conveyor operating over a roller at its discharge end, of loaf supporting means extending endwise from said discharge end of said belt conveyor and comprising a plurality of rollers including a single freely rotatable roller and a group of driven rollers, means for mounting said plurality of rollers for rotation about parallel axes extending parallel to the axis of said conveyor belt roller, the rollers of said group being of much smaller diameter than said conveyor belt roller, said roller mounting means comprising means for mounting said group and means for mounting said single roller, said group mounting means being pivoted to swing about an axis adjacent but spaced from and at a higher level than the axis of said conveyor belt roller and co-incident with the axis of an end roller of said group between a position in which said group of rollers is in a horizontal loaf supporting position with the top surfaces thereof in a plane below said conveyor belt surface and a dumping position, and means for mounting said single roller for movement between a position adjacent the other end roller of said group when said group is in loaf supporting position with its top surface below said plane and a position horizontally spaced therefrom, said single roller being of larger diameter than the rollers of said group.

References Cited in the file of this patent
UNITED STATES PATENTS

| | | |
|---|---|---|
| 1,270,000 | Boos et al. | June 18, 1918 |
| 1,688,219 | Williams | Oct. 16, 1928 |
| 2,624,444 | Casabona | Jan. 6, 1953 |
| 2,893,534 | Sexauer | July 7, 1959 |